United States Patent
Jaeger

(10) Patent No.: US 9,777,620 B2
(45) Date of Patent: Oct. 3, 2017

(54) TURBOCOMPOUND SCHEME, IN PARTICULAR IN THE FIELD OF INDUSTRIAL VEHICLES

(71) Applicant: FPT Motorenforschung AG, Arbon (CH)

(72) Inventor: Laurentius Jaeger, Zurich (CH)

(73) Assignee: FPT Motorenforschung AG, Arbon (CH)

( * ) Notice: Subject to any disclaimer, the term of this patent is extended or adjusted under 35 U.S.C. 154(b) by 347 days.

(21) Appl. No.: 14/577,143

(22) Filed: Dec. 19, 2014

(65) Prior Publication Data

US 2015/0176481 A1   Jun. 25, 2015

(30) Foreign Application Priority Data

Dec. 20, 2013 (EP) .................................. 13198836

(51) Int. Cl.

| | |
|---|---|
| *F02B 37/12* | (2006.01) |
| *F02B 37/00* | (2006.01) |
| *F02B 39/10* | (2006.01) |
| *F02B 41/10* | (2006.01) |
| *F01N 5/04* | (2006.01) |

(52) U.S. Cl.
CPC ............. *F02B 37/12* (2013.01); *F01N 5/04* (2013.01); *F02B 37/00* (2013.01); *F02B 37/004* (2013.01); *F02B 39/10* (2013.01); *F02B 41/10* (2013.01); *Y02T 10/144* (2013.01); *Y02T 10/163* (2013.01)

(58) Field of Classification Search
CPC .......... F01N 5/04; F02B 37/00; F02B 37/004; F02B 37/12; F02B 39/10; F02B 41/10; Y02T 10/144; Y02T 10/163
See application file for complete search history.

(56) References Cited

U.S. PATENT DOCUMENTS

| | | | | |
|---|---|---|---|---|
| 4,694,653 A | * | 9/1987 | Kawamura | ........... F02B 37/005 290/52 |
| 4,694,654 A | * | 9/1987 | Kawamura | ........... F02B 37/005 290/52 |
| 4,745,754 A | * | 5/1988 | Kawamura | ............. F02B 33/40 290/52 |

(Continued)

FOREIGN PATENT DOCUMENTS

| | | |
|---|---|---|
| EP | 0709559 A1 | 1/1996 |
| JP | 62093423 A * | 4/1987 |

(Continued)

*Primary Examiner* — Jason Shanske
*Assistant Examiner* — Jason T Newton
(74) *Attorney, Agent, or Firm* — Blank Rome LLP

(57) ABSTRACT

An improved turbocompound system, in particular in the field of industrial vehicles. A first turbine drives a fresh air compressor. A power turbine is arranged downstream of the first turbine and operatively coupled with the crankshaft of the engine through a clutch. A first electric motor/generator is operatively coupled with the turbocharger system. A second electric motor/generator is operatively coupled with the power turbine. The first and second electric motor/generators are electrically interconnected, and controlled as a motor or a generator in an opposite way with respect to each other, so that the electric energy produced by one is consumed by the other and vice versa.

17 Claims, 1 Drawing Sheet

(56) References Cited

U.S. PATENT DOCUMENTS

| | | | | |
|---|---|---|---|---|
| 4,756,377 A * | 7/1988 | Kawamura | ............... | B60K 6/22 180/165 |
| 4,774,811 A * | 10/1988 | Kawamura | ............... | B60K 6/24 180/165 |
| 4,958,497 A * | 9/1990 | Kawamura | ........... | F02B 37/013 60/608 |
| 5,881,559 A * | 3/1999 | Kawamura | ............... | B60K 6/24 123/192.2 |
| 7,383,684 B2 * | 6/2008 | Vuk | ......................... | B60K 6/24 60/597 |
| 7,893,554 B2 * | 2/2011 | Stahlhut | ................. | F02B 41/10 290/4 C |
| 8,205,450 B2 * | 6/2012 | Barthelet | ................ | F02B 37/04 60/608 |
| 8,225,608 B2 * | 7/2012 | Wu | ......................... | B60K 6/24 60/607 |
| 2008/0121218 A1 | 5/2008 | Algrain | | |
| 2010/0044127 A1 * | 2/2010 | Sartre | .................... | B60K 6/365 180/65.22 |
| 2010/0051363 A1 * | 3/2010 | Inoue | .................... | B60K 6/485 180/65.26 |
| 2011/0094485 A1 | 4/2011 | Vuk et al. | | |
| 2015/0047617 A1 * | 2/2015 | Benjey | .................. | B60K 6/485 123/559.3 |

FOREIGN PATENT DOCUMENTS

| | | | | | |
|---|---|---|---|---|---|
| JP | | 62093429 A * | 4/1987 | | |
| JP | | EP 0420705 A1 * | 4/1991 | ........... | F02B 37/005 |
| WO | WO 2012/163955 A1 | | 12/2012 | | |

* cited by examiner

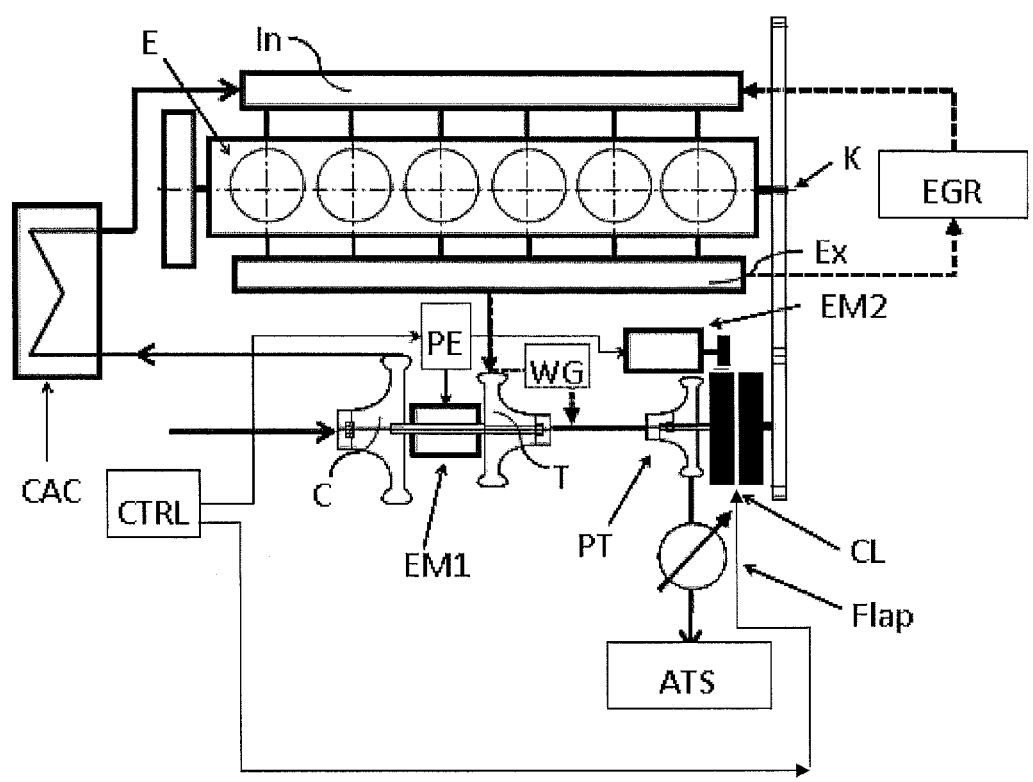

TURBOCOMPOUND SCHEME, IN PARTICULAR IN THE FIELD OF INDUSTRIAL VEHICLES

BACKGROUND OF THE INVENTION

1. Field of the Invention

The present invention relates to an improved turbocompound scheme, in particular in the field of industrial vehicles.

2. Description of the Related Art

Turbocompound systems have been known since the late 1960's.

For example, U.S. Pat. No. 4,100,742 shows a classical turbocompound configuration, wherein a first turbine stage drives a compressor, while a second turbine stage, usually called power turbine, is geared with the crankshaft in order to help the combustion engine.

A hydrodynamic coupling is commonly used to connect the power turbine to the crank train; this type of connection prevents the torsional vibrations of the crank shaft that are magnified by the high gear ratios of the transmission between crank shaft and turbine to affect the turbine.

The use of clutches, e.g. switchable hydrodynamic couplings to conned/disconnect power turbines to engine crank trains is known art, although it is seldom practiced.

The coupling of an electric motor with a turbo-charger is known in order to obtain a desired increase of compressor speed. However this implies the use of means for storing the energy needed to supply the electric motor.

The coupling of an electric motor, acting as a generator, with a turbocharger is known as well in order to obtain a desired reduction of compressor speed. This in turn implies the use of means for storing the energy generated by the electric machine.

SUMMARY OF THE INVENTION

The main object of the present invention is to provide an improved turbocompound scheme, made with mechanical and electrical devices, suitable to improve the overall efficiency of the known schemes, in particular, without the use of electric storage means; the proposed scheme is electrically self-sufficient, it does not require the presence of a hybrid vehicle electric environment with particular reference to the electric storage means for providing the energy to be conveyed to a traction electric drive. It is nevertheless suitable for integration into a hybrid vehicle.

The main principle of the invention is to stably gear a first electric motor/generator with the turbocharger shaft and to stably gear a second electric motor/generator with the power turbine shaft, geared with the crank train via a controllable clutch and to control the two electric machines in an opposite way, namely the first as generator and the second as motor or vice versa according to the actual operative conditions of the engine system.

Preferably, such conditions demand active control of the turbocharger speed or of the power turbine speed.

According to a first condition, when for example, it is required to increase the compressor speed above the values that can be attained by its sole turbine, the clutch between power turbine and crank train is commanded to be closed, while the electric motor on the power turbine works as a generator and is driven by the crank train to supplement electrical power to the motor coupled to the turbocharger. This condition can occur while the engine is fired or motored at any speed; with the engine in brake mode the condition occurs only up to a certain speed, typically the engine's high idle speed. In all modes, in the above condition the control objective is to increase the density of the air entering into the engine to increase the engine driving or braking torque.

At high engine speed and load, in fired mode, the turbine delivers more energy to the turbo shaft than is required by the compressor. In these conditions, it is preferable the clutch is commanded to be closed while the electric motor coupled with the turbocharger works a generator by transferring electrical power to the motor coupled with the power turbine, thus supplementing it finally to the crank train.

At high engine speed, during engine braking, it is desirable to decouple the power turbine from the crank trains. It is then necessary to avoid it over speeding. In this situation, it is also desirable to supplement energy to the turbocharger to increase engine braking capability. An embodiment of the invention proposes to transfer, in these conditions (clutch open), the energy gained by the electric motor coupled with the power turbine working as generator towards the motor coupled with the turbocharger.

Advantageously, the possibility to limit, when required, the speed of the power turbine, the latter can be designed to optimum blade-speed ratio in fired mode without constraints from over speed capabilities in motoring or engine brake condition.

Thanks to the present invention, the electrical energy produced by the first electric motor/generator is addressed to the second electric motor/generator and vice versa, without the use of electric storage means for temporary storing the produced electric energy. Thus the electric motor/generators are electrically interconnected, by power electronics that suitably adapt and control the electric currents flowing between the motor/generators.

In the present invention, the primary functions of the turbo charger and of the power turbine are maintained: Both convert enthalpy from the exhaust gas flow into mechanical torque and rotational speed; this mechanical power is used in the turbocharger to drive a compressor, whereas in the power turbine it is supplemented to the internal combustion engine crankshaft. Only the power used to control the speeds and/or boost pressure and/or air mass flow and/or the backpressure and/or turbine efficiency of the two turbo devices is transferred on the electric path. The bulk of the power of the turbines is transferred on the mechanical paths to their respective users.

Therefore, a first object of the present invention is an improved turbocompound scheme.

Another object of the present invention is a method of controlling said turbocompound scheme.

A further object of the present invention is a vehicle comprising said turbocompound scheme.

In this context the term scheme has the same meaning of system.

These and further objectives are achieved by means of the attached claims, which describe preferred embodiment of the invention, forming an integral part of the present description.

BRIEF DESCRIPTION OF THE DRAWINGS

The invention will become fully clear from the following detailed description, given by way of a mere exemplifying and non limiting example, to be read with reference to the attached drawing figures, wherein FIG. 1 shows the improved turbocompound scheme according to the present invention.

DETAILED DESCRIPTION OF THE PREFERRED EMBODIMENTS

According to FIG. 1, a combustion engine E, for example Diesel type, has an intake manifold In and an exhaust manifold Ex. A turbocharger unit T-C defines a first supercharging stage, having the first turbine T operatively connected immediately downstream of the exhaust manifold. The compressor C, driven by the first turbine T, sucks fresh air from the ambient, compresses it, while the intercooler unit CAC cools the compressed air before entering into the intake manifold In.

An EGR system and a wastegate valve WG can be implemented. In addition, the turbine T can be variable geometry type.

A second turbine PT is arranged downstream said first turbine T along the exhaust line, according the flow of the exhaust gasses. Also the power turbine can be variable geometry type. Such second turbine, is hereinafter called as power turbine, being coupled with the engine crankshaft K through a clutch CL and gears G for adapting the power turbine speed with the engine speed.

A first electric motor/generator EM1 is operatively coupled with the first supercharging stage. For example, the rotor of the electric motor/generator EM1 can have two opposite accessible ends, one of them axially connected with the shaft of the first turbine T and the other with the shaft of the compressor C.

The power turbine is stably operatively paired with a second electric motor/generator EM2.

Both the electric motor/generators EM1 and EM2 are electrically connected between each other via suitable power electronics PE, namely inverters/rectifiers and the like, and their functioning is controlled by control means CTRL. Said control means CTRL can also control the operation of the clutch CL.

Preferably, at high engine speeds and loads, the first electric motor/generator EM1 works as a generator for reducing the engine boost and thus the compressor speed, thus the electric energy produced by EM1 is addressed to the second electric motor/generator EM2, that cooperates—as a motor—with the power turbine in helping the engine, thus the fuel supply can be reduced. In particular the control means can be adapted to reduce automatically the fuel supplied—with respect to a corresponding position of the accelerator pedal—on the basis of the mechanical power provided by the second electric motor/generator EM2.

Preferably, at low engine speed and loads, and during load steps in fired mode, when the engine needs more boost from the compressor, the second electric motor/generator works as a generator, being coupled with the crank train, while the electric energy produced by it is addressed to the first electric motor/generator, that cooperates—as a motor—with the first turbine in driving the compressor.

Preferably at low and moderate engine speeds in engine brake mode, similarly as above, when the engine needs more boost from the compressor, the second electric motor/generator works as a generator, being coupled with the crank train, while the electric energy produced by it is addressed to the first electric motor/generator, that cooperates—as a motor—with the first turbine in driving the compressor.

Preferably at high engine speeds in engine brake mode, the power turbine is decoupled from the crank train by opening the respective clutch. To avoid the power turbine over speeding, the second electric motor/generator works as a generator, i.e. braking the power turbine, while the electric energy produced by it is addressed to the first electric motor/generator that cooperates—as a motor—with the first turbine in driving the compressor.

Thanks to the present invention, the electric energy in this system is produced and consumed without storing it. This implies a faster electric energy transfer and a better efficiency.

Amounts of power needed or supplied by external devices however can be transferred to/from loads/storage means/generators.

According to another embodiment of the present invention, the motor/generators can completely replace the well known alternator driven by the classical belt. Thus, the energy stored in the classical lead battery to restart the combustion engine and for powering the onboard auxiliary services can be supplied by said motor/generators.

Similarly, according to another embodiment of the present invention, the second motor/generator can completely replace the well known electric starting motor by rendering the classical geared starter motor obsolete.

Thus, not only the fuel consumption is reduced, but also the load response and engine brake capability of the engine system are improved.

According to a preferred embodiment of the invention, a flap can be arranged downstream of said power turbine PT along said exhaust line.

During engine braking operation, namely when the fuel supply is cut and the engine is motored by the vehicle inertia, the flap can be closed in order to develop a backpressure, which increases the pumping work of the combustion engine and thus the engine braking effect.

The control of the electric motor/generators and optionally of the clutch, is carried out by control means that can be integrated within the engine control unit ECU or in another specific control unit.

The present invention can be implemented advantageously in a computer program comprising program code means for performing one or more steps of such method, when such program is run on a computer. For this reason the patent shall also cover such computer program and the computer-readable medium that comprises a recorded message, such computer-readable medium comprising the program code means for performing one or more steps of such method, when such program is run on a computer.

Many changes, modifications, variations and other uses and applications of the subject invention will become apparent to those skilled in the art after considering the specification and the accompanying drawings which disclose preferred embodiments thereof. All such changes, modifications, variations and other uses and applications which do not depart from the spirit and scope of the invention are deemed to be covered by this invention.

Further implementation details will not be described, as the man skilled in the art is able to carry out the invention starting from the teaching of the above description.

What is claimed is:

1. A turbocompound system, in particular in the field of industrial vehicles, comprising
    a combustion engine having a crankshaft,
    a first turbocharger system comprising a first turbine and a fresh air compressor, wherein the first turbine drives the fresh air compressor,
    a power turbine arranged downstream of said first turbine, operatively coupled with said crankshaft through a clutch, a first electric motor/generator coupled with said turbocharger system, a second electric motor/generator coupled with said power turbine, the first and second electric motor/generators being electrically interconnected, and a control unit programmed to control said first and second electric motor/generators to operate either as a motor or as a generator and is programmed to control one of said first and second electric motor/generators to operate in an opposite way with respect to the other, so that:

when the first electric motor/generator operates as a generator producing electric energy, the second electric motor/generator operates as a motor, and the electric energy produced by the first electric motor/generator is consumed by the second electric motor/generator, and when the second electric motor/generator operates as a generator producing electric energy, the first electric motor/generator operates as a motor, and the electric energy produced by the second electric motor/generator is consumed by the first electric motor/generator.

2. The turbocompound system according to claim 1, wherein said control unit is programmed to control said first and second electric motor/generators according to said opposite way while the combustion engine is in an engine fired condition and/or in motored and engine brake conditions or in transient and/or in stationary operations of the combustion engine.

3. The turbocompound system according to claim 2, wherein said control unit is programmed to check the following conditions:

the combustion engine is fired and it is required to decrease a speed of the fresh air compressor and when said conditions are verified, said control unit is programmed to control said first electric motor/generator to work as a generator and said second electric motor/generator to work as a motor and to command a closing of said clutch in order to supplement the crankshaft.

4. The turbocompound system according to claim 3, wherein, said control unit is programmed to reduce automatically an amount of fuel supplied to the combustion engine—with respect to a corresponding position of an accelerator pedal—on the basis of a mechanical power provided by said second electric motor/generator.

5. The turbocompound system according to claim 2, wherein said control unit is programmed to check the following conditions:

high engine speed during combustion engine braking and when said conditions are verified, said control unit is programmed to command the opening of said clutch and to control said second electric motor/generator to work as a generator by limiting a speed of the power turbine and to control said first electric motor/generator to work as a motor to increase a speed of the fresh air compressor, in order to increase a combustion engine braking torque.

6. The turbocompound system according to claim 1, wherein said control unit is able to check a condition where it is required to increase a speed of the fresh air compressor and when said condition is verified, said control unit is programmed to control said first electric motor/generator to work as a motor and said second electric motor/generator to work as a generator and to command the closing of said clutch.

7. The turbocompound system according to claim 6, wherein said control unit is programmed to perform said control when at least one of the following further conditions are verified: the combustion engine is fired or the combustion engine is motored or in low or moderate speed of a braking condition.

8. An industrial vehicle comprising the turbocompound system according to claim 1.

9. The turbocompound system according to claim 1, wherein all of the electrical energy is produced and consumed without battery storage.

10. A method of controlling a turbocompound system, in particular in the field of industrial vehicles, the turbocompound system comprising a combustion engine having a crankshaft, a first turbocharger system, wherein a first turbine drives a fresh air compressor, a power turbine arranged downstream of said first turbine and coupled with said crankshaft through a clutch, a first electric motor/generator coupled with said first turbocharger system, a second electric motor/generator is operatively coupled with said power turbine, the first and second electric motor/generators being electrically interconnected, and wherein a control unit is programmed to control each of said first and second electric motor/generators to operate either as a motor or as a generator, the method comprising controlling each of said first and second electric motor/generators to operate in an opposite way with respect to the other, so that:

when the first electric motor/generator operates as a generator producing electric energy, the second electric motor/generator operates as a motor, and the electric energy produced by the first electric motor/generator is consumed by the second electric motor/generator, and when the second electric motor/generator operates as a generator producing electric energy, the first electric motor/generator operates as a motor, and the electric energy produced by the second electric/motor generator is consumed by the first electric/motor generator.

11. The method according to claim 10, wherein said procedure to control said first and second electric motor/generators according to said opposite way, is performed while the combustion engine is in an engine fired condition and/or in motored and engine brake conditions or in transient and/or in stationary operations of the combustion engine.

12. The method according to claim 11, further comprising the checking of the following conditions: the combustion engine is fired and it is required to decrease a speed of the fresh air compressor and when said conditions are verified, the procedure comprises the controlling of said first electric motor/generator to work as a generator and said second electric motor/generator to work as a motor and the commanding of a closing of said clutch in order to supplement the crankshaft.

13. The method according to claim 11, further comprising the checking of the following conditions: high engine speed during combustion engine braking and when said conditions are verified, the procedure comprises commanding of the opening of said clutch and controlling said second electric motor/generator to work as a generator by limiting a speed of the power turbine and controlling said first electric motor/generator to work as a motor to increase a speed of the fresh air compressor, in order to increase a braking torque of the combustion engine.

14. The method according to claim 13, further comprising the step of reducing automatically an amount of fuel supplied to the combustion engine, with respect to a corresponding position of an accelerator pedal, on the basis of a mechanical power provided by said first electric motor/generator.

15. The method according to claim 10, wherein said procedure comprises checking a condition where it is required to increase a speed of the fresh air compressor and when said condition is verified, the procedure comprises controlling said first electric motor/generator to work as a motor and said second electric motor/generator to work as a generator and commanding a closing of said clutch.

16. The method according to claim 15, wherein said procedure is carried out when at least one of the following further conditions are verified: the combustion engine is fired or the combustion engine is motored or in low and moderate speed of a braking condition.

17. The method according to claim 10, wherein all of the electrical energy is produced and consumed without battery storage.

\* \* \* \* \*